United States Patent [19]

Bankstahl

[11] 4,240,462

[45] Dec. 23, 1980

[54] RECESSED VALVE

[75] Inventor: Norbert Bankstahl, Wolfschlugen, Fed. Rep. of Germany

[73] Assignee: Friedrich Grohe Armaturenfabrik GmbH & Co., Hemer, Fed. Rep. of Germany

[21] Appl. No.: 971,003

[22] Filed: Dec. 19, 1978

[51] Int. Cl.³ .................................... F16K 27/00
[52] U.S. Cl. ............................ 137/377; 137/315; 285/4
[58] Field of Search ........... 137/377, 382, 797, 359, 137/360, 74, 315; 285/4; 222/541

[56] References Cited

U.S. PATENT DOCUMENTS

| 1,266,246 | 5/1918 | Fulton | 137/382 |
| 1,684,572 | 9/1928 | Boosey | 285/4 |
| 1,890,357 | 12/1932 | Barber | 137/382 |
| 1,951,645 | 3/1934 | Boosey | 285/4 |
| 3,331,386 | 7/1967 | Politz | 137/360 |
| 3,339,215 | 9/1967 | Flood | 285/4 |
| 3,472,427 | 10/1969 | Schaefer | 137/797 |
| 3,480,299 | 11/1969 | Henderson | 285/4 |
| 3,835,615 | 9/1974 | King, Jr. | 285/4 |

FOREIGN PATENT DOCUMENTS 842958 7/1952 Fed. Rep. of Germany .......... 137/382

*Primary Examiner*—Martin P. Schwadron
*Assistant Examiner*—A. Michael Chambers
*Attorney, Agent, or Firm*—James B. Raden; Donald J. Lenkszus

[57] ABSTRACT

A recessed valve includes a protective valve cover sleeve and an actuating spindle, wherein the sleeve is provided with spaced-apart circumferential notches which permit an installer to shorten the sleeve in steps. The spindle has similar notches which also permit shortening its length.

3 Claims, 3 Drawing Figures

RECESSED VALVE

BACKGROUND OF THE INVENTION

The invention relates to a recessed valve for sanitary engineering fittings.

When recessed valves of this kind are installed, different installation depths occur. Particularly in the case of shallow recessed valves, the protective sleeve with the actuating handle often protrude from the wall almost to their full length and thus, apart from their unsightly appearance, cause hindrances through the handles which protrude so far.

The system of providing interchangeable, rigid spindle and sleeve sections to match the differing installation depth into the wall is known. However, spindles and sleeve sections of different lengths must always be available during installation.

The system of connecting the handle with a telescopic device adjustable in length to the valve is also known. However, this design is relatively complicated and expensive and, in addition, the spindle is carried relatively loosely so that perfect functioning is not guaranteed over a longer period of time.

SUMMARY OF THE INVENTION

It is an object of the invention to provide a recessed valve which can be matched to different wall recess depths during precision installation by the installation engineer at favorable cost using the simplest materials by means of simple manual action.

In accordance with the invention, a recessed valve includes a protective sleeve surrounding a spindle, the sleeve having a plurality of circumferential notches which allow the sleeve to be shortened in steps corresponding to different recess depths.

In an embodiment of the invention, individual rings, approximately 5 mm in length, limited by the notches, can be broken off from the protective sleeve during precision installation by the installation engineer using a simple tool, e.g., combination pliers. The fracture surfaces require no further preparation as has been determined by experiments. Consequently, the protruding upper part of the valve can be matched to the handle in an extremely short period of time. Even when additional extension pieces are used, either the protective sleeves or also the extension sleeves can be shortened.

Further in accordance with the invention, the actuating spindle in the serrated region can also be provided with notches corresponding to those provided in the protective sleeve in the case of handles relatively flat in form. During precision installation, the protective sleeve and the end of the spindle should then be shortened accordingly. By this means, the accommodation bore in the handle for the spindle can be considerably shortened in form.

DESCRIPTION OF THE DRAWING

The invention may be better understood from a reading of the following detailed description in conjunction with the drawing in which:

In FIGS. 1 and 2, a recessed valve is shown on which a valve top part 3 with an actuating spindle 4 is screwed onto a valve casing 1 with connecting apertures 2. A protective sleeve 5 with a securing thread 6 to protect the actuating spindle 4 and to provide axial hold for the actuating handle 7 is screwed onto the casing of the top part of the valve 3. A cover rosette 9 is movably arranged on the outer cylindrical surface area 8 of the protective sleeve 5. The actuating handle 7 is fixed axially but rotatably mounted by means of an eccentric nose 10 which engages a collar 11 formed on the extreme end face of the protective sleeve 5. The actuating handle 7 is coupled by serrations 13 to the actuating spindle 4 allowing axial movement but not radial movement. The depth of the accommodating bore 14 for accomodating the actuating spindle is arranged to correspond to the maximum matching length. Circumferential notches 12, spaced approximately 5 mm apart, are provided in the region of the securing thread 6 on the outer surface area 8 of the protective sleeve 5.

During precision installation, the distance between the wall and the actuating handle 7 can now be individually matched, depending upon the prevailing installation conditions, using a simple tool, e.g., combination pliers, by simply breaking off the rings limited by the notches. Where there are, for example, four notches spaced approximately 5 mm apart, the handle can be moved 20 mm closer to the wall within the shortest period of time. Further preparations to the fracture surfaces are not required. Even when supplementary extensions are used, the protective sleeve or the extension sleeve can also be shortened in the same way.

Figure 1:
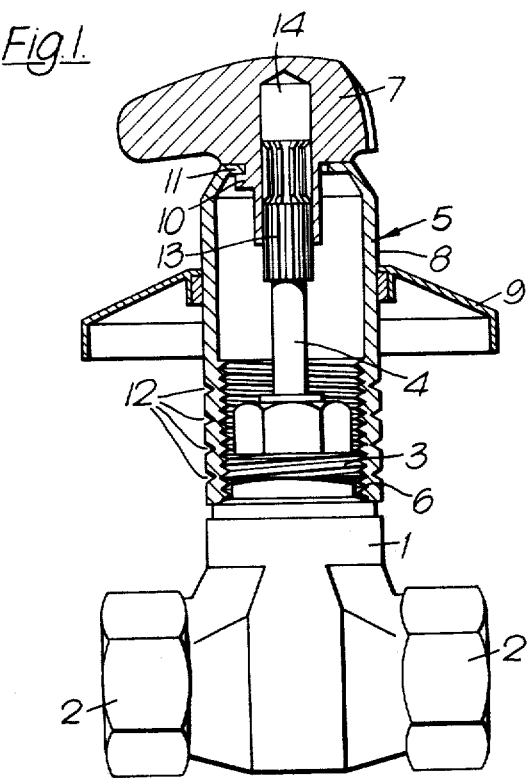
FIG. 1 illustrates a recessed valve in accordance with the invention partially in longitudinal section.
Figure 2:
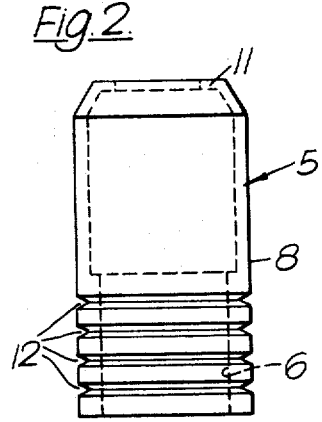
FIG. 2 shows the protective sleeve of FIG. 1.
Figure 3:
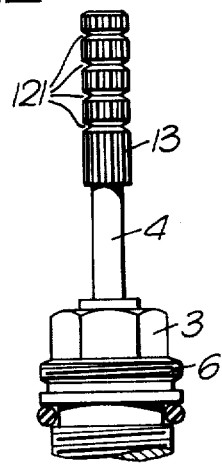
FIG. 3 shows an actuating spindle with a part of the top part of the valve for another recessed valve.

Another embodiment is shown in FIG. 3 in which the accommodation bore 14 in the handle 7 can be formed in considerably shortened manner. Equidistant notches 121 are formed on the extreme end of the actuating spindle 4 in the area of the serrations 13.

During precision installation, as already described, the appropriate number of rings on the protective sleeve are now broken off by the installation engineer. However, in addition, the actuating spindle is shortened at the appropriate notch 121 whereby the shortening operation can be made, for example, by simply sawing through the notch. After the notching operation, the protective sleeve can be assembled to the actuating handle and rosette immediately without further preparatory work.

What is claimed is:

1. A recessed valve comprising:
   - a valve casing having apertures for connection to supply lines;
   - valve means;
   - an actuating spindle coupled at one end to said valve means and having adjacent its other end a serrated surface portion, said serrated surface portion including a first plurality of circumferential notches each of said first plurality of notches providing a weakened portion such that said spindle may be shortened;
   - a protective sleeve surrounding said spindle, said protective sleeve having a radially inward projecting flange at one end, and a portion adjacent the other end having a second plurality of circumferential notches, each of said second plurality of notches providing a weakened portion such that said sleeve may be shortened; and
   - an actuating handle having a bore adapted to receive said other end of said spindle, said handle being rotatably mounted on said flange and including means adapted to engage said flange for limiting axial movement.

2. A recessed valve in accordance with claim 1, wherein said circumferential notches on said sleeve and said circumferential notches on said spindle are spaced apart by equal intervals.

3. A recessed valve in accordance with claim 1, wherein said circumferential notches are arranged at an approximate interval of 5 mm.

* * * * *